(12) United States Patent
Akasaka et al.

(10) Patent No.: US 6,878,000 B2
(45) Date of Patent: Apr. 12, 2005

(54) CARD CONNECTOR

(75) Inventors: Junya Akasaka, Kanagawa (JP); Hiroyuki Suwa, Yamanashi (JP)

(73) Assignees: Tyco Electronics AMP K.K., Kanagawa (JP); Fanuc Ltd., Yamanashi (JP)

( * ) Notice: Subject to any disclaimer, the term of this patent is extended or adjusted under 35 U.S.C. 154(b) by 24 days.

(21) Appl. No.: 10/623,106

(22) Filed: Jul. 17, 2003

(65) Prior Publication Data
US 2004/0067669 A1 Apr. 8, 2004

(30) Foreign Application Priority Data
Jul. 18, 2002 (JP) ........................................ 2002-209234

(51) Int. Cl.⁷ .............................................. H01R 13/62
(52) U.S. Cl. ........................................ 439/153; 439/142
(58) Field of Search ................................ 439/159, 152, 439/153, 155, 157, 160, 372, 135, 136, 142, 144, 133, 304, 327, 347; 361/684, 732, 785, 798

(56) References Cited

U.S. PATENT DOCUMENTS

| | | | |
|---|---|---|---|
| 4,887,188 A | * 12/1989 | Yoshida et al. | ............. 439/153 |
| 6,039,587 A | 3/2000 | Oguchi | ......................... 439/159 |
| 6,045,377 A | * 4/2000 | Kajiura | ......................... 439/159 |
| 6,176,714 B1 | * 1/2001 | Ishida et al. | ................. 439/159 |
| 2001/0008815 A1 | * 7/2001 | Zuin | ........................... 439/327 |

FOREIGN PATENT DOCUMENTS

JP          6-13072          2/1994          ......... H01R/13/629

* cited by examiner

*Primary Examiner*—P. Austin Bradley
*Assistant Examiner*—Felix O. Figueroa
(74) *Attorney, Agent, or Firm*—Barley Snyder

(57) ABSTRACT

A connector is provided to reduce the risk of erroneous ejection of a card from a card connector during use thereof. A stopper member is rotatably mounted on a knob of an ejecting mechanism. The stopper member is urged in the counterclockwise direction by a spring. When the knob protrudes in a state in which the card is not inserted in the connector, the stopper member, urged by the spring, exits a slot of the knob, rotates about a pin, and a rear end of the stopper member enters a card receiving slot. Accordingly, a card cannot be inserted into the card receiving slot 3 due to the protrusion of the stopper member into the card receiving slot.

5 Claims, 4 Drawing Sheets

CARD CONNECTOR

FIELD OF THE INVENTION

The present invention relates to a card connector, and particularly to a card connector having a push/push type ejecting mechanism.

BACKGROUND

Card connectors for housing cards, such as Personal Computer Memory Card International Association (PCMCIA) cards (also referred to as Personal Computer cards or PC cards), are utilized in personal computers and the like. These card connectors typically include ejection means to eject the card, so that other cards may be used with the personal computer or the like. When a card is inserted into the card connector, it is undesirable to have a knob for ejecting the card protrude from the equipment in order to avoid inadvertent card ejection and to avoid breakage of the knob. For this reason, connectors with what is known as "push/push" type ejecting mechanisms are utilized, wherein during use of the card, the knob is pressed into the connector so as to not protrude the equipment.

U.S. Pat. No. 6,039,587 is directed to one connector using a "push/push" ejection mechanism. This push/push type ejecting mechanism provides a knob which is in a depressed position during use. The knob is caused to protrude by re-pressing it, when ejection of a card is desired. Ejection of the card is accomplished by pressing the knob, which is in a protruded position. More specifically, the push/push ejecting mechanism comprises a cam follower and a heart shaped cam groove. The cam follower is caused to be positioned sequentially at two predetermined positions, which are separated in the insertion/ejection direction of the card, by operation of the knob. Thereby, the knob is capable of assuming a depressed position in which the knob is pressed in, and a protruded position, in which the knob protrudes from the connector.

The knob of the ejecting mechanism is pressed when it is in the protruding position to eject the card. After the card is ejected, the knob is maintained in the depressed position and in this state, another card may be inserted into a card receiving slot. However, if the knob is accidentally pressed prior to insertion of another card, the knob protrudes to the exterior, that is, toward a user, in a state in which a card is not inserted. Since a card is insertable in a state in which the knob protrudes in existing connectors with push/push type ejection mechanisms, there is a possibility that another user may insert a card that he/she desires to use. Then, during use, if the user feels that the knob is in the way, he/she may press the knob in. Since the connector is designed to eject the card when the knob in the protruded state is pressed in, the card may be inadvertently ejected. Therefore, although it is not the intention of the user to eject the card, the card is ejected, which may adversely effect the operation of the computer. For example, if a computer controlled manufacturing apparatus is being used in an assembly line, then a problem, such as the cessation of manufacturing, may occur by inadvertent ejection of the card from the computer.

SUMMARY OF THE INVENTION

In one embodiment of the present invention, a card connector is provided that reduces the risk of erroneous ejection of cards during use. The card connector of the present invention has a card receiving slot for receiving a card and a push/push type ejecting mechanism for ejecting the card provided in the vicinity of the card receiving slot. The ejecting mechanism is provided with a knob and a stopper member. The stopper member is rotatably mounted on the knob and configured to rotatably assume a first position, recessed from the card receiving slot, when the knob is in a depressed position, and a second position, protruding into the card receiving slot to prevent insertion of the card, when the knob is in a protruded position.

DETAILED DESCRIPTION

Figure 1:
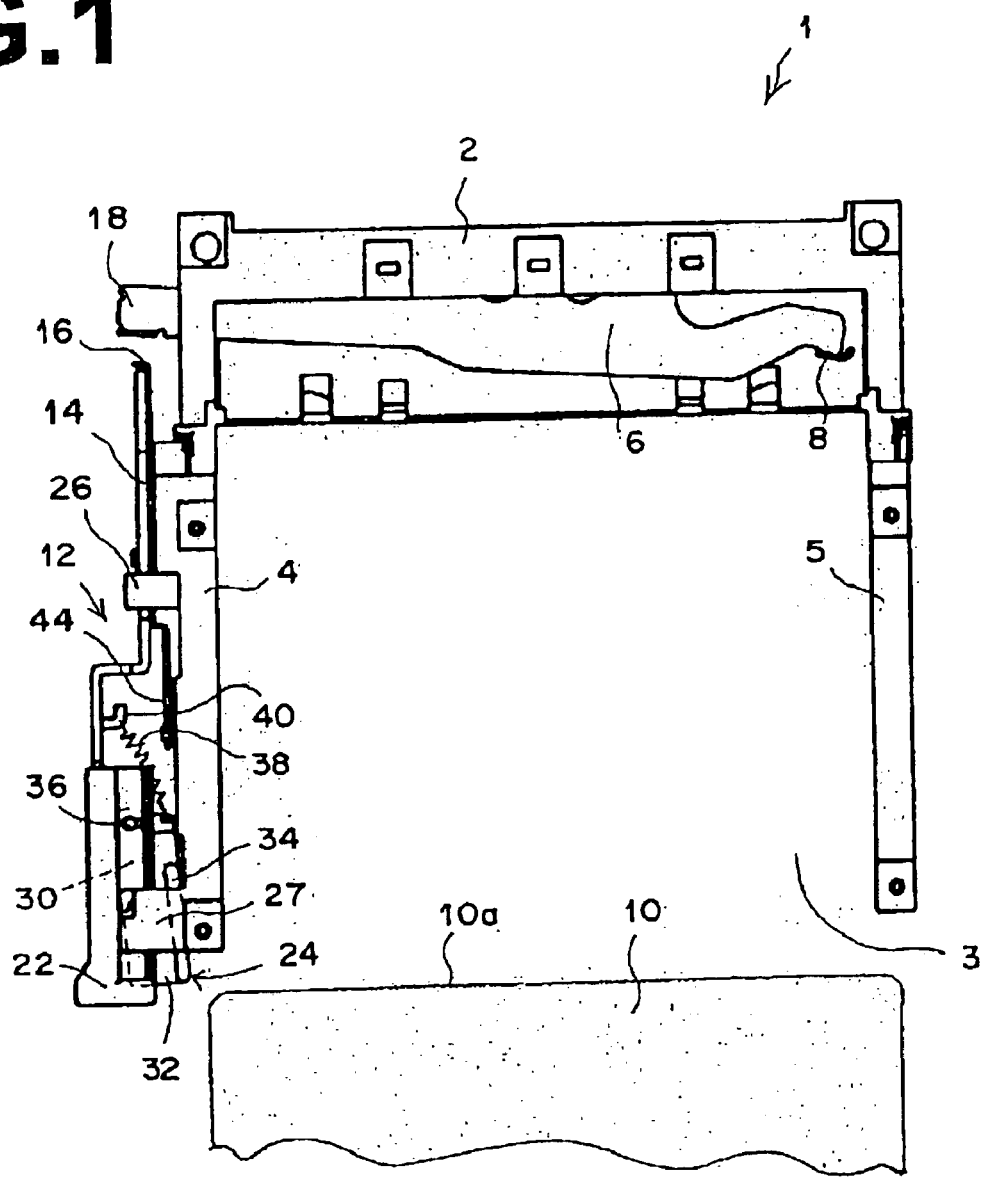
FIG. 1 is a plan view of an exemplary connector according to the present invention, showing a state in which a stopper member is recessed from a card receiving slot.
Figure 2:
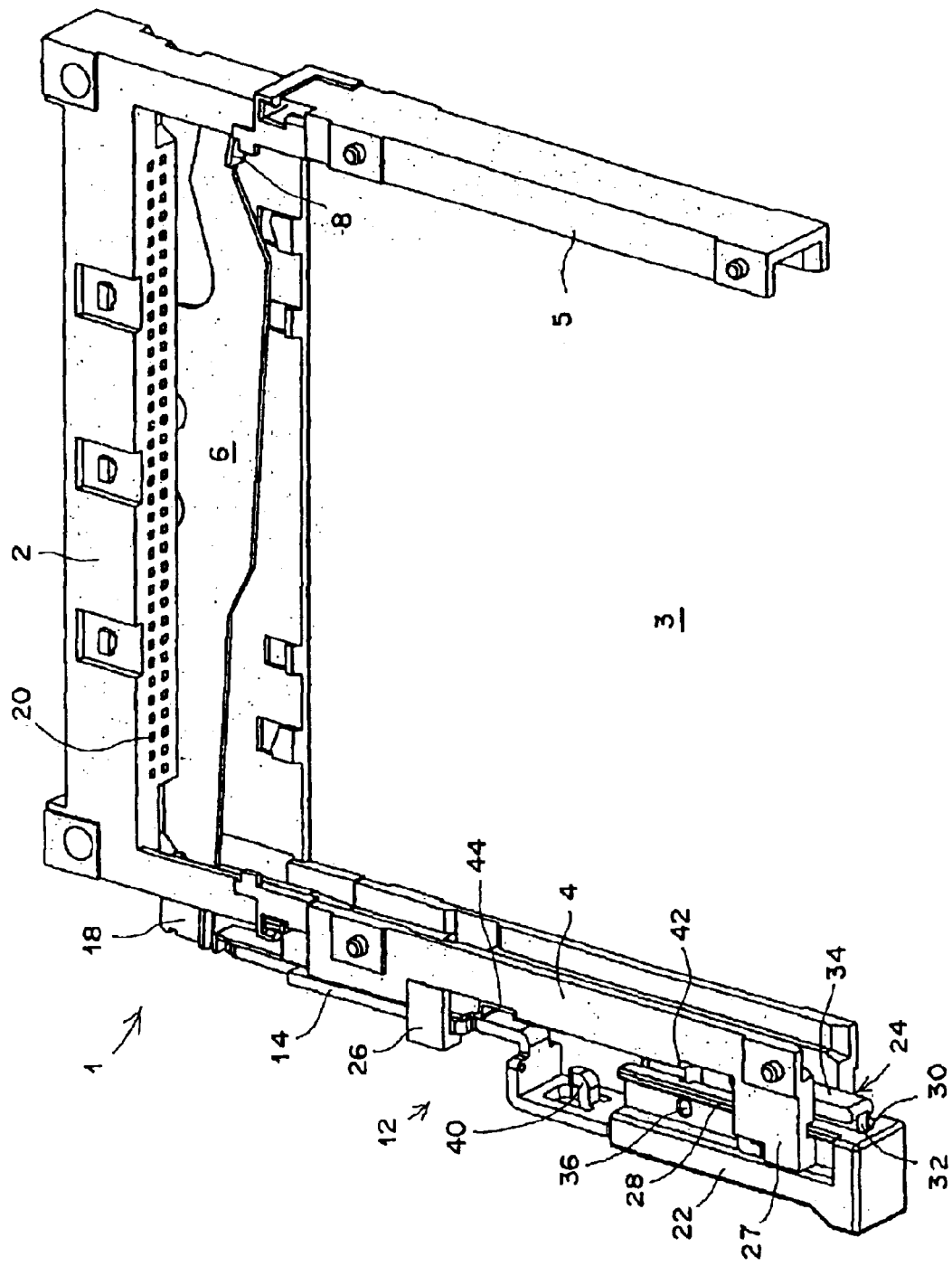
FIG. 2 is a perspective view of the connector shown in FIG. 1.

Following is a description of an exemplary embodiment of the card connector (hereinafter simply referred to as "connector") of the present invention with reference to the attached drawings. FIG. 1 is a plan view of the connector of the present invention, showing a state in which a stopper member 32 is recessed from a card receiving slot 3. FIG. 2 is a perspective view of the connector shown in FIG. 1.

As shown in FIGS. 1 and 2, a connector 1 comprises: a main body 2, in which a plurality of contacts (not shown) are arranged, and card guides 4 and 5. Card guides 4 and 5 are C-shaped in cross section and are mounted on both ends of the main body 2. A plurality of contact housing apertures 20 (FIG. 2), into which contacts of a card 10 are inserted, are arranged in the main body 2. The card receiving slot 3, configured for receiving the card 10, is defined by the pair of card guides 4 and 5.

The main body 2 is provided with a cam bar 6 for ejecting the card 10, that swings within a plane parallel to the drawing sheet of FIG. 1. An end surface 8 is disposed at one end of cam bar 6 and is configured to abut a front end 10a of the card 10 (FIG. 1) to eject the card 10. The other end 18 of the cam bar 6 protrudes from the main body 2 and abuts the front end 16 of an ejector bar 14 of an ejecting mechanism 12, to be described later. The ejector bar 14 is configured to cause the cam bar 6 to swing. Note that here, "front" refers to the direction toward the top of the connector 1 in FIG. 1, and that "rear" refers to the direction toward the bottom of the connector 1 in FIG. 1.

Ejection mechanism 12 is a push/push type ejecting mechanism (hereinafter, simply referred to as "ejecting mechanism"), which is mounted on the card guide 4. The ejecting mechanism 12 comprises: an ejector bar 14 that extends in the insertion/ejection direction of the card 10 and may be formed by punching and bending a metal plate; a knob 22 mounted on the rear end of the ejector bar 14; a stopper member 24 rotatably mounted on the knob 22; and a tongue piece 44 mounted at the approximate midpoint of the ejector bar 14.

The ejecting mechanism 12 alternately maintains the knob 22 in a protruded position (second position—shown in FIGS. 3 and 4) and a depressed position (first position— shown in FIGS. 1 and 2), by simply depressing the knob 22 repetitively. This is achieved by the engagement relationship between a heart shaped cam groove 11 (FIG. 4) which is formed on the outer side surface of the card guide 4, and a cam follower (not shown) mounted on the tongue piece 44. That is, each time that the knob 22 is depressed, the cam follower of the tongue piece 44 stops at either of a predetermined depressed position and a predetermined protruded position within the heart shaped cam groove 11, to perform positioning of the knob 22. The heart shaped cam groove 11 is of a structure known in the art, and therefore, a detailed description thereof will be omitted.

The ejector bar 14 has an L-shaped bend at its approximate midpoint, and the distal end thereof is gripped by a pair of brackets 26 that protrude from the card guide 4 so as to be slidable in the insertion/ejection direction of the card 10. The knob 22 has a rib 28 that extends in the insertion/ejection direction of the card 10, integrally formed therewith. The rib 28 is slidably held by a pair of brackets 27, which are formed integrally with the card guide 4. In addition, a slot 30 that extends in the insertion/ejection direction of the card 10 is formed in the surface of the knob 22 that faces the card guide 4.

The stopper member 24 is substantially rectangular in shape and may be formed of a resin or other suitable materials. The stopper member 24 comprises a plate portion 32 that enters the slot 30; and a reinforcement portion 34 formed integrally with the plate portion 32 on a side edge thereof so that the two portions perpendicularly intersect. The stopper member 24 is rotatably supported on the knob 22 by a pin 36. A coil spring 38 (omitted from FIG. 2) is hooked on an inwardly facing protrusion 40 provided on the ejector bar 14 and a front end portion of the stopper member 24. Thereby, the stopper member 24 is constantly urged in the counterclockwise direction about the pin 36. However, when the knob 22 is in the depressed state, as shown in FIGS. 1 and 2, the stopper member 24 is pressed into the slot 30 by the card guide 4. The ejector bar 14 is constantly urged to protrude from the connector 1 by a coil spring (not shown) hooked on the ejector bar 14 and the card guide 4.

A cutout 42 (FIG. 2) is formed in the vicinity of the rear edge of the card guide 4. The cutout 42 extends from the rear edge of the card guide 4, and is of a size capable of receiving the stopper member 24. When the stopper member 24 is housed within the knob 22 as shown in FIG. 1 and FIG. 2, that is, when the stopper member 24 and the knob 22 are aligned, nothing impedes the passage of the card 10 through the card receiving slot 3. Therefore, the card 10 is capable of being inserted smoothly into the card receiving slot 3. The knob 22 shown in FIG. 1 and FIG. 2 is in a position in which it is pressed into the connector 1 (i.e., depressed). In this state, the card 10 has been ejected from the connector 1. Therefore, another card 10 may be inserted into the card receiving slot 3.

Figure 3:
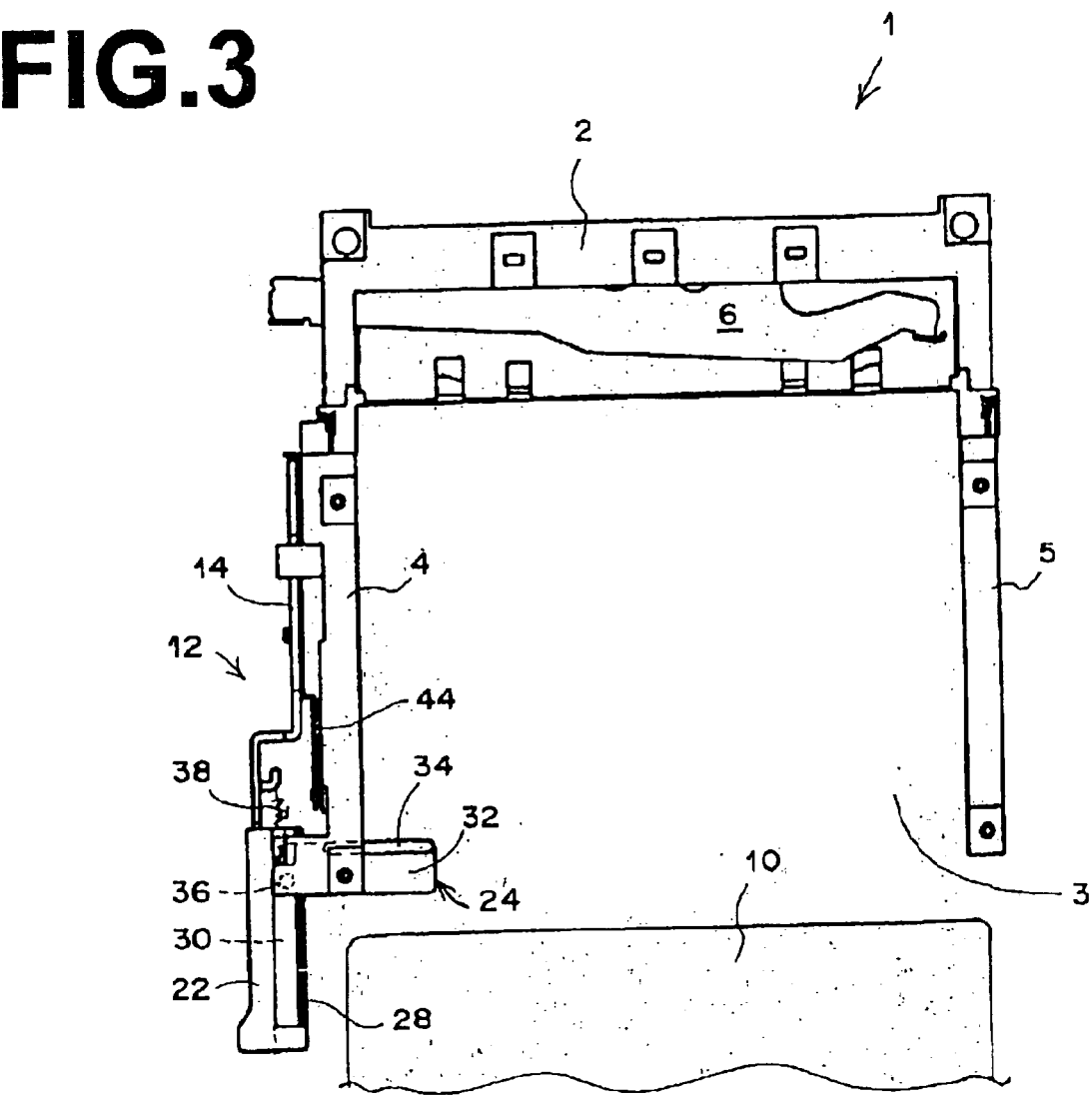
FIG. 3 is a plan view of the connector of FIG. 1, showing a state in which the stopper member is protruding into the card receiving slot.
Figure 4:
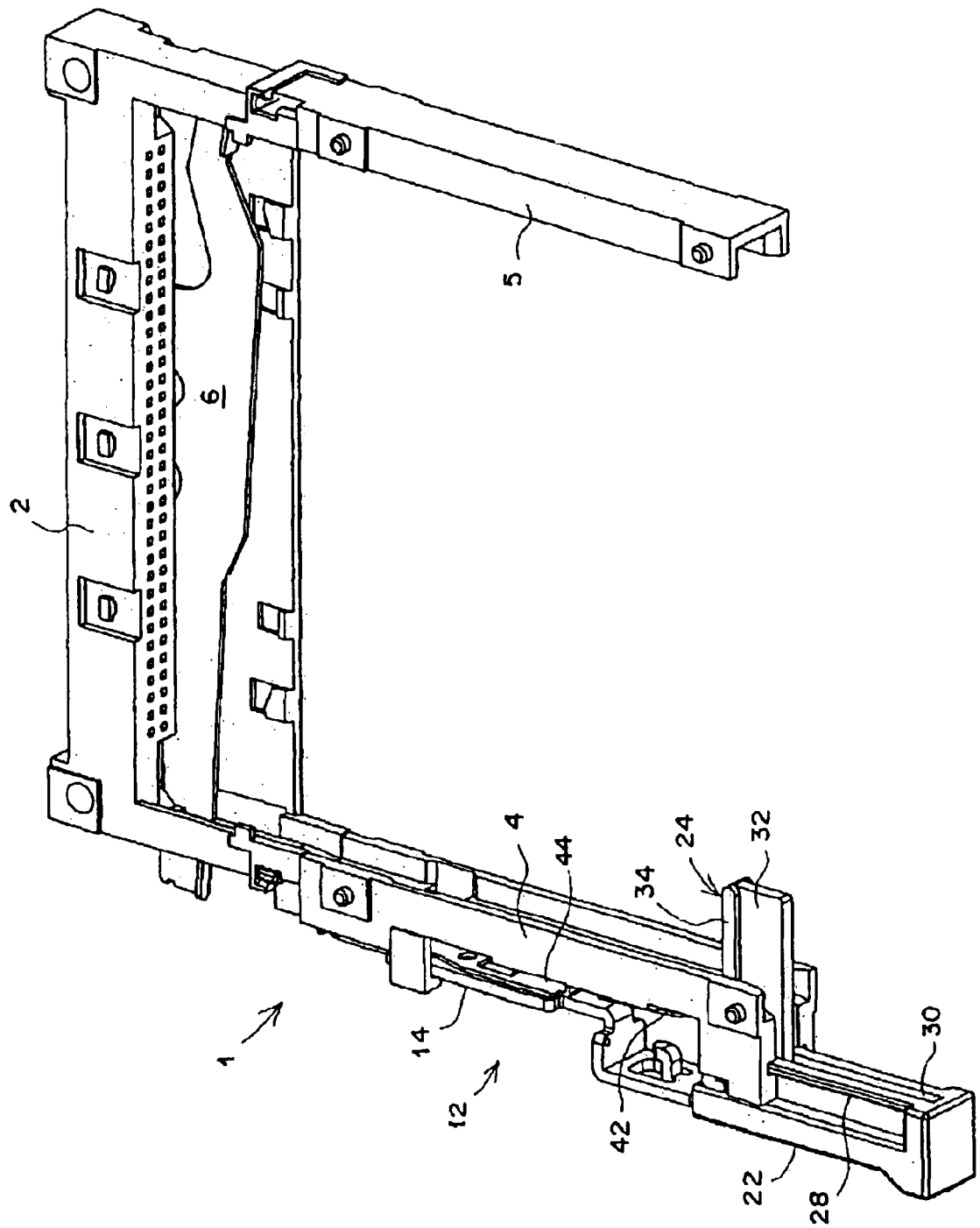
FIG. 4 is a perspective view of the connector shown in FIG. 3.

As described previously, when knob 22 is pressed it goes from the recessed position (shown in FIGS. 1 and 2) to the protruded position (shown in FIGS. 3 and 4) and vise versa. A card 10 will be ejected if knob 22 is pressed while it is in the protruded position. When knob 22 goes to the protruded position, stopper member 24 rotates about pin 36 to a position protruding into card receiving slot 3, unless a card is present in receiving slot 3. FIG. 3 is a plan view of the connector 1 of FIG. 1 showing a state in which the knob 22 is in the protruding position and the stopper member 24 is protruding into the card receiving slot 3. FIG. 4 is a perspective view of the connector 1 shown in FIG. 3. If the knob 22 is erroneously pressed while knob 22 is in the depressed position, the ejecting mechanism 12 causes the knob to protrude to the position shown in FIG. 3. Normally, if the knob 22 is pressed again from this protruded position, the card 10 housed in the connector 1 is ejected from receiving slot 3. However, if knob 22 has been pressed from the recessed position prior to inserting a card 10, as shown in FIG. 3 and FIG. 4, then there is no card 10 in the card receiving slot 3. In this state, it would be possible to insert another card 10 into the connector 1, if the stopper member 24 was not protruding into the card receiving slot 3. Then, during use of the other card 10, the knob 22 would be in the protruded position. If the user were to press the knob 22 from the protruded position, the ejection mechanism would eject the card 10 during use thereof.

However, in an exemplary connector 1 according to the present invention, the stopper member 24 enters the card receiving slot 3 to prevent the insertion of another card 10, as shown in FIG. 3 and FIG. 4. The cooperation of the knob 22 and the stopper member 24 will be described. If the knob 22 is in its protruded position, the stopper member 24 exits the slot 30 of the knob 22 and rotates about the pin 36 (FIG. 1, FIG. 2) so that the rear end of the stopper member 24 enters the card receiving slot 3 through the cutout 42 of the card guide 4. This is due to the coil spring 38, which urges the stopper member 24 in the counterclockwise direction. Accordingly, if the knob 22 is in the protruded state, the card 10 may not be inserted into the card receiving slot 3 preventing accidental ejection caused by erroneously pressing the knob 22 after inserting the card 10 while the knob 22 is in the protruded state.

To insert the card 10 into connector 1, the knob 22 must be pressed in so that it assumes the recessed position shown in FIG. 1 and FIG. 2. Otherwise, the stopper member 24 will prevent insertion of the card 10. To eject the card 10 after use, the knob 22, which is in the recessed position shown in FIG. 1 (and FIG. 2), is pressed to cause it to protrude. Then, the knob 22 in the protruded state is pressed in to eject the card 10.

While the present invention has been described above with reference to an exemplary embodiment thereof, the invention is not limited to the embodiment described. To the contrary, various modifications and changes are possible within the scope of the present invention. Accordingly, the scope of the present invention should be determined in accordance with the following claims.

What is claimed is:

1. A card connector comprising:

a card receiving slot for receiving a card; and a push/push type ejecting mechanism for ejecting the card provided in the vicinity of the card receiving slot; the ejecting mechanism having a knob; and a stopper member rotatably mounted on the knob and configured to assume a first position recessed from the card receiving slot, when the knob is in a depressed position, and a second position, protruding into the card receiving slot to prevent insertion of the card, when the knob is in a protruded position, wherein the stopper member is constantly urged to protrude into the card receiving slot by a biasing member.

2. A connector as defined in claim 1 wherein the biasing member is a spring.

3. A connector as defined in claim 2, wherein said spring is affixed at one end to the stopper member an at another end to the ejecting mechanism.

4. A connector as defined claim 2 wherein, the card receiving slot is defined by a pair of card guides and in the first position, the stopper member is aligned with the knob, against an urging force of the spring by one of the card guides.

5. A card connector as defined in claim 1, wherein the knob is provided with a slot that extends in direction of insertion ejection of the card; and in the first position, the member is positioned within the slot.

* * * * *

UNITED STATES PATENT AND TRADEMARK OFFICE
CERTIFICATE OF CORRECTION

PATENT NO. : 6,878,000 B2
DATED : April 12, 2005
INVENTOR(S) : Akasaka et al.

It is certified that error appears in the above-identified patent and that said Letters Patent is hereby corrected as shown below:

Column 4,
Line 53, "the stopper member an" should read -- the stopper member and --.
Line 56, "card guides and in" should read -- card guides and, in --.
Line 61, "extends in direction" should read -- extends in a direction --.
Line 62, "of insertion ejection" should read -- of insertion/ejection --.

Signed and Sealed this

Fourteenth Day of February, 2006

JON W. DUDAS
*Director of the United States Patent and Trademark Office*